United States Patent

Kim

[11] Patent Number: 5,949,949
[45] Date of Patent: Sep. 7, 1999

[54] DIGITAL VIDEO SIGNAL PROCESSOR

[75] Inventor: Yong-je Kim, Suwon, Rep. of Korea

[73] Assignee: Samsung Electronics Co., Ltd., Kyungki-Do, Rep. of Korea

[21] Appl. No.: 08/877,552

[22] Filed: Jun. 17, 1997

[30] Foreign Application Priority Data

Jun. 17, 1996 [KR]  Rep. of Korea ...................... 96-21840

[51] Int. Cl.[6] .............................. H04N 9/79; H04N 7/12; H04N 5/92
[52] U.S. Cl. ............................. 386/33; 386/40; 386/112; 386/124
[58] Field of Search .................................. 386/1, 33, 40, 386/109, 111, 112, 124; 348/384, 385, 386, 387, 390, 391, 395, 396, 403, 404; H04N 5/76, 5/92, 9/79, 7/12

[56] References Cited

U.S. PATENT DOCUMENTS

| | | | |
|---|---|---|---|
| 5,019,914 | 5/1991 | Dropsy ..................................... | 358/310 |
| 5,574,566 | 11/1996 | Takakura et al. ........................ | 386/112 |
| 5,574,568 | 11/1996 | Juri et al. ................................. | 386/112 |
| 5,862,292 | 1/1999 | Kubota et al. ........................... | 386/124 |
| 5,878,183 | 3/1999 | Sugiyama et al. ....................... | 386/112 |

FOREIGN PATENT DOCUMENTS 0 610 587   8/1994   European Pat. Off. ....... H04N 5/265

OTHER PUBLICATIONS

Patent Abstracts of Japan, vol. 12, No. 449, Nov. 25, 1988; & JP 63–175593 A (Toshiba Corp) Jul. 19, 1988 *Abstract.

Primary Examiner—Thai Tran
Attorney, Agent, or Firm—Sughrue, Mion, Zinn, Macpeak & Seas, PLLC

[57] ABSTRACT

A digital video signal processor for compressing a digital video signal and recording the compressed signal. The digital video signal processor includes a black-and-white signal detector which determines whether the digital video signal is a black-and-white signal and outputs a detection signal when it is determined that the digital video signal is a black-and-white signal. A block processor shuffles the digital video signal from the black-and-white signal detector by predetermined block units. A signal compressor compresses shuffled video signal output by the block processor. A modulator modulates compressed video signal output by the signal compressor and black-and-white signal information. A controller generates a compression control signal to be output to the signal compressor and outputs the black-and-white signal information to the modulator in response to the detection signal. When the compression control signal is received, the signal compressor transform-encodes the shuffled video signal such that a color component is encoded only with a DC coefficient. As a result, a black-and-white video signal can be recorded with higher-resolution.

7 Claims, 3 Drawing Sheets

DIGITAL VIDEO SIGNAL PROCESSOR

BACKGROUND OF THE INVENTION

1. Field of the Invention

The present invention relates to a digital video signal processor, and more particularly, to a digital video signal processor such as a digital video tape recorder or a digital video camera for processing a black-and-white video signal. The present invention is based on Korean Application No. 96-21840, which is incorporated herein by reference.

2. Description of the Related Arts

In general, when video data is recorded on a video tape in a digital video cassette recorder or a digital camcorder, the video data is recorded in a predetermined format.

FIGS. 1A through 1C illustrate one of the recording formats of a general digital video cassette recorder.

FIG. 1A shows a discrete cosine transform (DCT) block which is a set of 8×8 (64) pixels. FIG. 1B shows a macro block having six DCT blocks, i.e., four luminance components Y1, Y2, Y3 and Y4, and two color difference components Cb and Cr. FIG. 1C shows a video segment which consists of five macro blocks MB1, MB2, MB3, MB4 and MB5. Each of the DCT blocks for the luminance components Y1, Y2, Y3 and Y4 of the macro block in FIG. 1B are discrete-cosine-transformed to be 14 bytes of DCT coefficients, which includes one DC coefficient and a plurality of AC coefficients. Also, each of the DCT blocks for the color difference components Cb and Cr are discrete-cosine-transformed to be 10 bytes of DCT coefficients, which includes one DC coefficient and a plurality of AC coefficients.

However, in the general digital video signal recorder, even when a user records a black-and-white video signal, the AC coefficients of the color difference components Cb and Cr are still recorded on the tape, which results in a lowering of the compression efficiency. Further, the AC coefficients of the color difference components Cb and Cr may vary without being kept at a predetermined level, which results in noise in the video signal.

SUMMARY OF THE INVENTION

The object of the present invention is to provide a black-and-white video signal recorder for reducing noise and recording a black-and-white video signal with high resolution when it is desired to record a black-and-white signal only in a video signal.

According to one aspect of the present invention to achieve the above object, there is provided a digital video signal processor for compressing a digital video signal and recording the compressed signal. In the digital video signal processor, a black-and-white signal detector determines whether the digital video signal is a black-and-white signal and outputs a detection signal when it is determined that the digital video signal is a black-and-white signal. A block processor shuffles the digital video signal from the black-and-white signal detector by predetermined block units. A signal compressor compresses shuffled video signal output by the block processor. A modulator modulates compressed video signal output by the signal compressor and black-and-white signal information. A controller generates a compression control signal to be output to the signal compressor and outputs the black-and-white signal information to the modulator in response to the detection signal. When the compression control signal is received, the signal compressor transform-encodes the shuffled video signal such that a color component is encoded only with a DC coefficient. As a result, a black-and-white video signal can be recorded with higher-resolution.

According to another aspect of a digital video signal processor of the present invention, a block processor shuffles the digital video signal by predetermined block units. A signal compressor compresses shuffled video signal output by the block processor. A modulator modulates compressed video signal output by the signal compressor and black-and-white signal information. A controller generates a compression control signal to be output to the signal compressor and outputs the black-and-white signal information to the modulator in response to a key input signal externally provided by a user. When the compression control signal is received, the signal compressor transform-encodes the shuffled video signal such that a color component is encoded only with a DC coefficient.

BRIEF DESCRIPTION OF THE DRAWINGS

The object and advantages of the present invention will become more apparent by describing in detail preferred embodiments thereof with reference to the attached drawings in which.

DETAILED DESCRIPTION OF THE INVENTION

Figure 2:
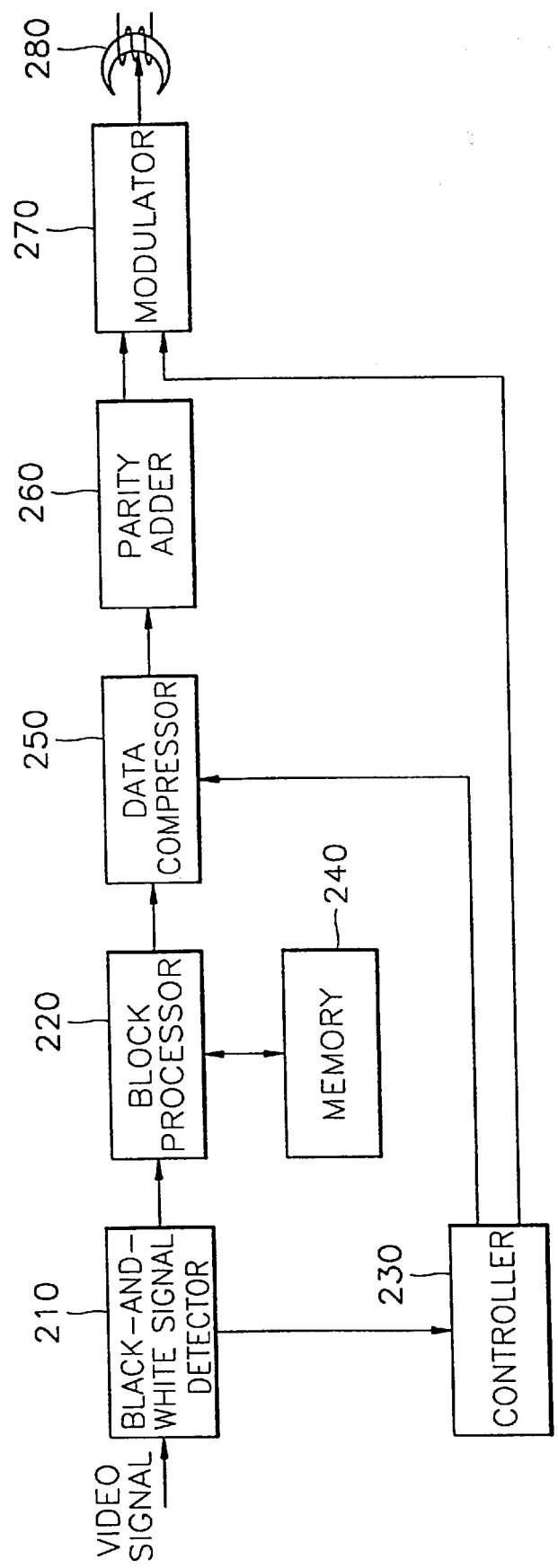
FIG. 2 is a block diagram of an embodiment of a digital video signal processor according to the present invention.

Referring to FIG. 2, a digital video signal processor of the present invention includes a black-and-white signal detector 210 for determining whether an input video signal is a black-and-white signal, a block processor 220 for shuffling the video data output by the black-and-white signal detector 210 to build up a video segment, a memory 240 for temporarily storing the data processed by the block processor 220, a data compressor 250 for compressing data output by the block processor 220, a parity adder 260 for adding parity to compressed video data output by the data compressor 250, a modulator 270 for modulating video data received from the parity adder 260 and black-and-white signal information data, a recording head 280 for recording the modulated data in a recording medium, and a controller 230 for applying a compression control signal to the data compressor 250 to set color components to a predetermined value and generating black-and-white signal information according to the detection signal from the black-and-white signal detector 210.

In FIG. 2, an input video signal is a digital video signal converted from an analog video signal so that it can be recorded in a recording medium of a digital video cassette recorder or a digital video camera.

The black-and-white signal detector 210 determines whether the digital video signal is a black-and-white signal or a color signal. There are many methods for performing such a determination. For example, when a digital video signal does not include a color burst signal, the digital video signal is determined to be a black-and-white signal. Otherwise, the digital video signal is determined to be a color signal.

The block processor 220 carries out shuffling of the data output by the black-and-white signal detector 210 to increase the compression efficiency. When data is shuffled, macro block units are taken from five different areas of one frame and combined to be a segment unit. The memory 240 temporarily stores data processed by the block processor 220. During playback, the shuffled data is unshuffled in a reproducer (not shown) to be restored to the original data.

The data compressor 250 compresses the digital video signal from the block processor 220 by carrying out a discrete cosine transform (DCT) and variable-length coding (VLC).

When the black-and-white signal detector 210 receives a black-and-white video signal, it applies a black-and-white detection signal, which is an active high pulse, to the controller 230. Upon receiving the detection signal, the controller 230 generates and outputs the compression control signal to the data compressor 250 so that the data compressor 250 transform-encodes the shuffled video signal using only a DC coefficient. Also, the controller 230 outputs the black-and-white signal information to the modulator 270 in response to the detection signal.

In response to the compression control signal output by the controller 230, the data compressor 250 converts a DC coefficient among the DCT coefficients of the color difference components Cb and Cr into a predetermined DC value and sets the AC coefficients to zero.

Since the AC coefficients become zero, that is, there is no changing signal except for a DC signal, noise in an input video data signal or quantization noise is reduced.

Furthermore, if the data amount of the encoded luminance components is large, the luminance components may be recorded in the area which was allocated for the AC coefficients of the color components. In the present embodiment, the DC level is 128, which is a median value of numbers represented by 8 bits.

Figure 1C:
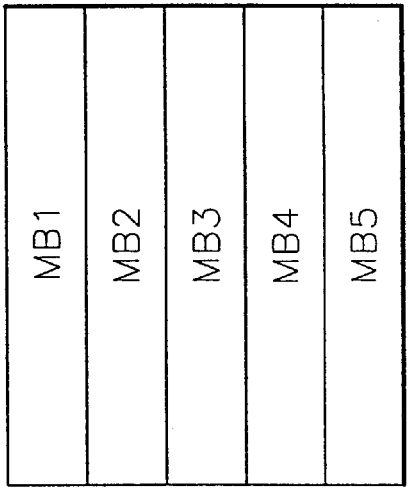
FIGS. 1A–1C illustrate recording formats of a general digital video cassette recorder.
Figure 1B:
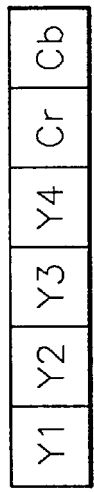
Figure 1A:
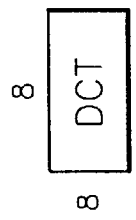

As a result, when the color component is converted into a predetermined DC value in the data compressor 250, the resolution is increased since more AC coefficients of the transformed luminance component may be recorded in the area for the color components Cr and Cb of the macro block shown in FIG. 1B compared with the case in which a color signal exists.

Meanwhile, the parity adder 260 adds a parity to the video data output by the data compressor 250 so that the video data is reproduced from the medium with negligible error during a playback. The modulator 270 modulates the video data output by the parity adder 260 and the black-and-white signal information generated by the controller 230, so that a recording head 280 records the modulated data on the recording medium.

The black-and-white signal information which is recorded as side information is used to reproduce the recorded data in a black-and-white video signal during the playback.

Figure 3:
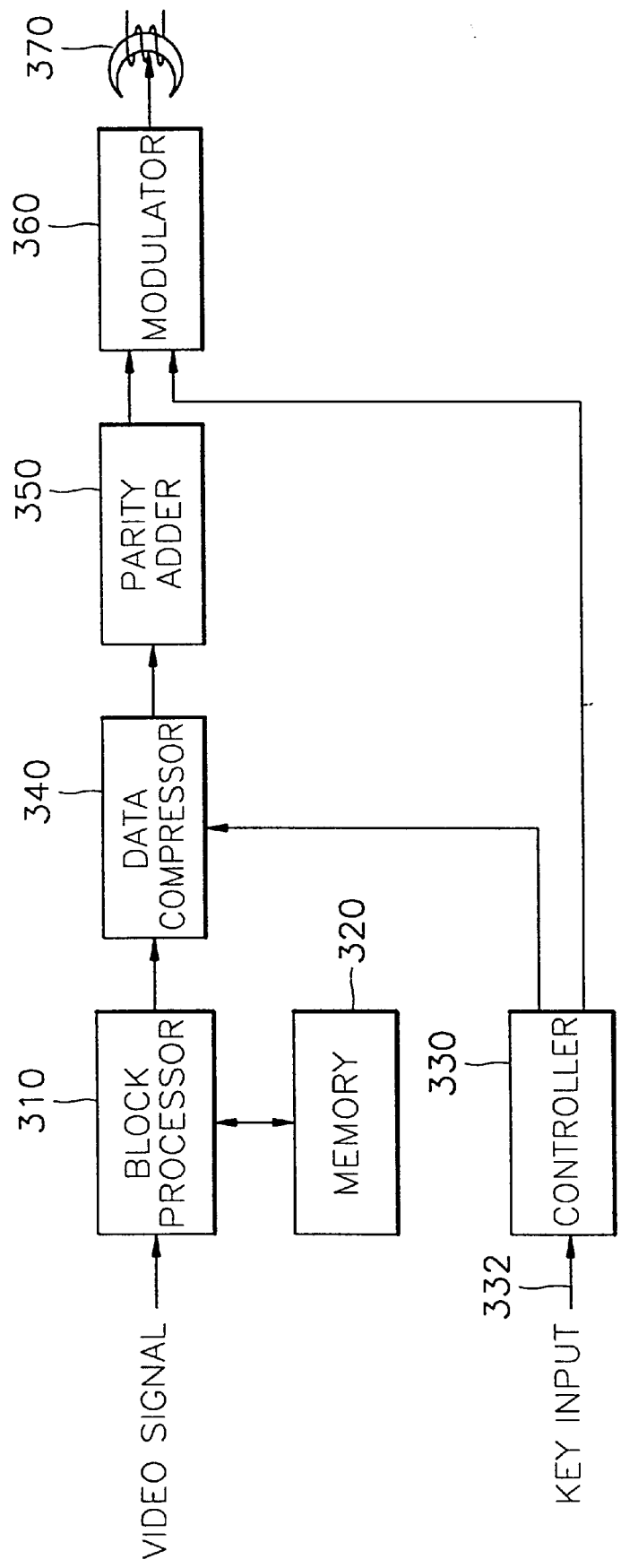
FIG. 3 is a block diagram of another embodiment of the digital video signal processor according to the present invention.

FIG. 3 is a block diagram of a second embodiment of the digital video signal processor according to the present invention.

The digital video signal processor of FIG. 3 includes a block processor 310 for shuffling an input digital video signal, a memory 320 for temporarily storing the data processed by the block processor 310, a data compressor 340 for compressing the video data output by the block processor 310, a parity adder 350 for adding parity to the compressed video data output by the data compressor 340, a modulator 360 for modulating video data output by the parity adder 350 and black-and-white signal information data, a recording head 370 for recording the modulated data in a recording medium, and a controller 330 for applying a compression control signal to the data compressor 340 to set color components to a predetermined value and generating a black-and-white signal information in response to a key input signal 332.

When a user wants to record a video signal in a black-and-white mode, the user may apply a key input to the apparatus, which may be a digital camcoder or a digital VCR. Upon receiving the key input signal 332, the controller 330 generates a compression control signal and black-and-white signal information.

The block processor 310 carries out shuffling of the input video data and makes up video segments so that the compression efficiency is increased. Meanwhile, the shuffled data is unshuffled to be restored to the original data during the playback.

The data compressor 340 compresses the digital video signal from the block processor 310 by carrying out a discrete cosine transform (DCT) and variable-length coding (VLC).

Upon receiving the compression control signal, the data compressor 340 converts a DC coefficient among the DCT coefficients of the color difference components Cb and Cr into the predetermined DC value and sets the AC coefficients to zero.

The parity adder 350 adds a parity to the video data output by the data compressor 340 so that the video data is reproduced from the medium with negligible error during playback. The modulator 360 modulates the video data output by the parity adder 350 and the black-and-white signal information generated by the controller 330, so that the recording head 370 records on the recording medium.

The black-and-white signal information which is recorded as side information is used to reproduce the recorded data in a black-and-white video signal during playback.

As described above, the present invention reduces noise by setting a color component to a predetermined level when a video signal is recorded in a black-and-white mode. Further, a luminance component may be recorded in the area in which the color component would otherwise be recorded, thereby increasing the resolution of the signal.

While only certain embodiments of the invention have been specifically described herein, it will apparent that numerous modifications may be made thereto without departing from the spirit and scope of the invention.

What is claimed is:

1. A digital video signal processor for compressing a digital video signal and recording the compressed signal, comprising:

a black-and-white signal detector for determining whether the digital video signal is a black-and-white signal and outputting a detection signal when it is determined that the digital video signal is a black-and-white signal;

a block processor for shuffling the digital video signal from said black-and-white signal detector by predetermined block units;

a signal compressor for compressing shuffled video signal output by said block processor;

a modulator for modulating compressed video signal output by said signal compressor and black-and-white signal information; and a controller for generating a compression control signal to be output to said signal compressor and outputting the black-and-white signal information to said modulator in response to the detection signal, wherein said signal compressor transform-encodes the shuffled video signal such that a color component is encoded only with a DC coefficient when the compression control signal is received.

2. A digital video signal processor as claimed in claim 1, wherein said black-and-white signal detector determines that the digital video signal is a black-and-white signal when a color burst signal is absent in the digital video signal.

3. A digital video signal processor as claimed in claim 1, wherein said signal compressor converts the value of the DC coefficient of the encoded signal into a predetermined value when the compression control signal is received.

4. A digital video signal processor as claimed in claim 3, wherein the predetermined value is an average of numbers represented by 8 bits.

5. A digital video signal processor for compressing a digital video signal and recording the compressed signal, comprising:

a block processor for shuffling the digital video signal by predetermined block units;

a signal compressor for compressing shuffled video signal output by said block processor;

a modulator for modulating compressed video signal output by said signal compressor and black-and-white signal information; and a controller for generating a compression control signal to be output to said signal compressor and outputting the black-and-white signal information to said modulator in response to a key input signal externally provided by a user, wherein said signal compressor transform-encodes the shuffled video signal such that a color component is encoded only with a DC coefficient when the compression control signal is received.

6. A digital video signal processor as claimed in claim 5, wherein said signal compressor converts the value of the DC coefficient of the encoded signal into a predetermined value when the compression control signal is received.

7. A digital video signal processor as claimed in claim 6, wherein the predetermined value is an average of numbers represented by 8 bits.

* * * * *